(12) United States Patent
Rhelimi

(10) Patent No.: US 10,608,826 B2
(45) Date of Patent: Mar. 31, 2020

(54) METHOD FOR AUTHENTICATING ATTRIBUTES IN A NON-TRACEABLE MANNER AND WITHOUT CONNECTION TO A SERVER

(71) Applicant: GEMALTO SA, Meudon (FR)

(72) Inventor: Alain Rhelimi, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 298 days.

(21) Appl. No.: 15/536,387

(22) PCT Filed: Dec. 9, 2015

(86) PCT No.: PCT/EP2015/079059
§ 371 (c)(1),
(2) Date: Jun. 15, 2017

(87) PCT Pub. No.: WO2016/096554
PCT Pub. Date: Jun. 23, 2016

(65) Prior Publication Data
US 2017/0346642 A1 Nov. 30, 2017

(30) Foreign Application Priority Data
Dec. 19, 2014 (EP) .................................. 14307103

(51) Int. Cl.
*H04L 9/00* (2006.01)
*H04L 9/32* (2006.01)
(Continued)

(52) U.S. Cl.
CPC .......... *H04L 9/3265* (2013.01); *H04L 9/0637* (2013.01); *H04L 9/3213* (2013.01);
(Continued)

(58) Field of Classification Search
None
See application file for complete search history.

(56) References Cited

U.S. PATENT DOCUMENTS

2006/0235850 A1   10/2006   Hazelwood et al.
2014/0359289 A1   12/2014   Camenisch et al.

FOREIGN PATENT DOCUMENTS

WO   WO 2006/108815 A1   10/2006
WO   WO-2013001092 A1 *   1/2013   ............. H04L 9/321

OTHER PUBLICATIONS

International Search Report (PCT/ISA/210) dated Jan. 29, 2016, by the European Patent Office as the International Searching Authority for International Application No. PCT/EP2015/079059.
(Continued)

*Primary Examiner* — Alexander Lagor
(74) *Attorney, Agent, or Firm* — Buchanan Ingersoll & Rooney PC

(57) ABSTRACT

The present invention relates to a method, for a provider entity belonging to a provider group, to authenticate its belonging to an attribute provider group to a verification entity in a non-traceable manner without necessitating to share secret or large constants compromising privacy. Both entities comprise at least one attribute group arborescence, this attribute group arborescence being shared by the provider entity and the verification entity when the provider entity has the attribute. According to the invention, when a verification is triggered, the verification entity calculates a certificate from the attribute group arborescence, said certificate being calculated from the authentication tokens of the groups along the arborescence from the attribute verification group's token to the consumer group's token.

10 Claims, 9 Drawing Sheets

(51) Int. Cl.
   *H04L 29/06*      (2006.01)
   *H04L 9/06*       (2006.01)
(52) U.S. Cl.
   CPC ............ *H04L 29/06* (2013.01); *H04L 63/065* (2013.01); *H04L 63/0823* (2013.01); *H04L 63/104* (2013.01); *H04L 2209/42* (2013.01)

(56) References Cited

OTHER PUBLICATIONS

Written Opinion (PCT/ISA/237) dated Jan. 29, 2016, by the European Patent Office as the International Searching Authority for International Application No. PCT/EP2015/079059.
Menezes, Vanstone, Oorschot: "Handbook of Applied Cryptography", CRC Press LLC, USA, XP001525012, p. 515-p. 516, 1997.

* cited by examiner

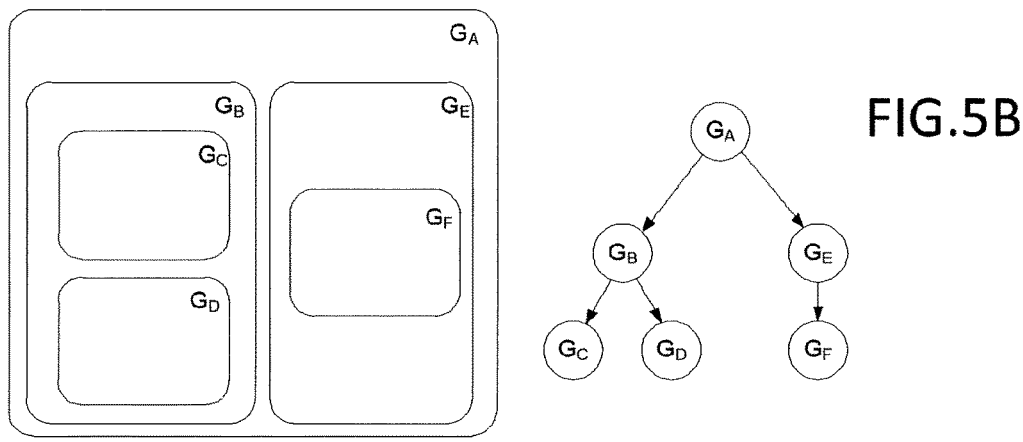
FIG.5A
FIG.5B
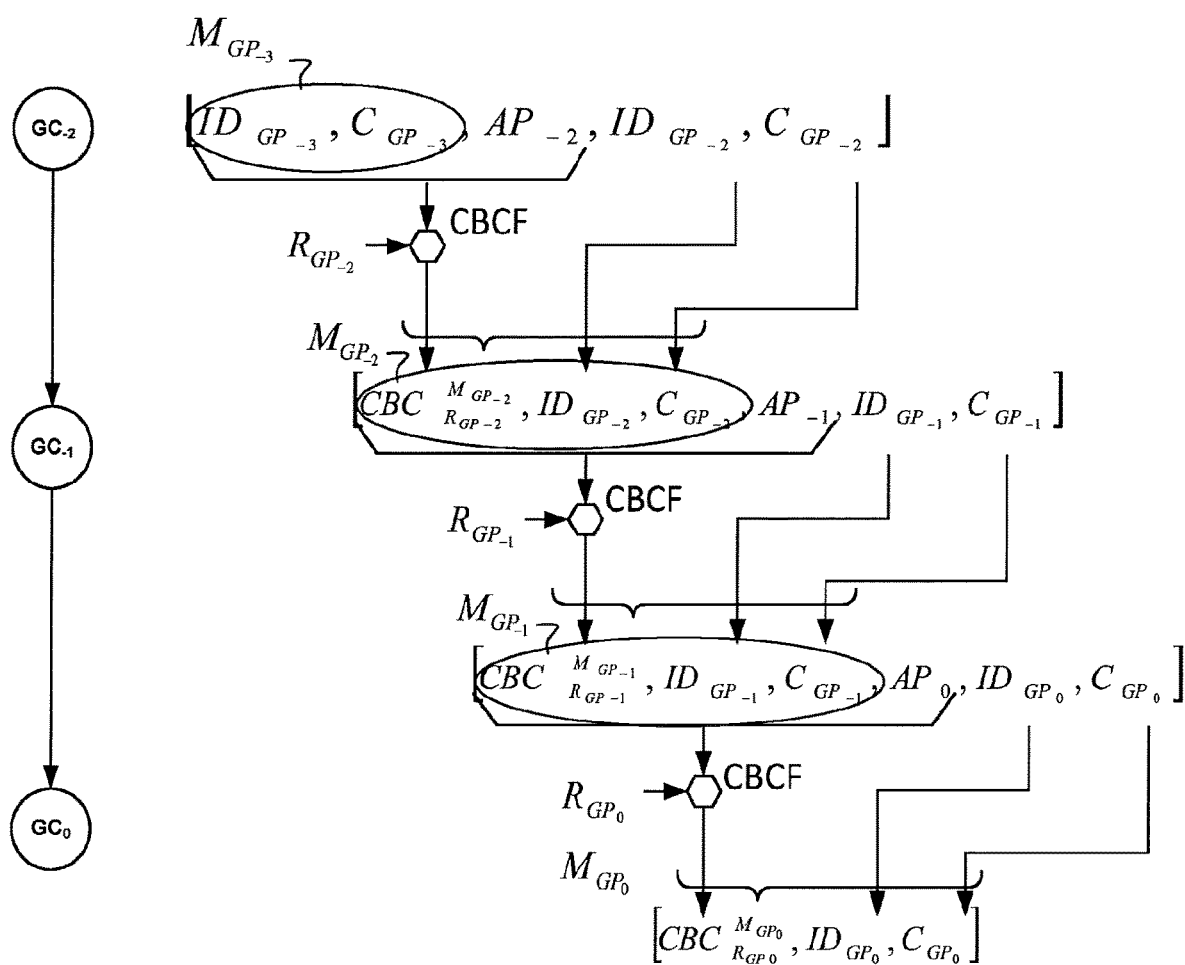
FIG.6

METHOD FOR AUTHENTICATING ATTRIBUTES IN A NON-TRACEABLE MANNER AND WITHOUT CONNECTION TO A SERVER

FIELD OF THE INVENTION

The present invention relates to a method for authenticating attributes in a non-traceable manner and without connection to a server. The protocol of the invention allows this authentication as non-traceable and without shared keys. More particularly, the invention relates to the context of Random Handback Authentication (RHA) already enabling to reach these purposes. The invention enables to shorten the duration of the authentication process and to render it compatible with constrained devices.

The invention also pertains to a device using said method.

BACKGROUND OF THE INVENTION

FIG. 1 shows schematically the functioning and the context of Random Handback Authentication (RHA), the principle of which being used in the invention.

The RHA exposes similar property as RSA. It uses a legacy encryption/decryption principle as the AES but presents the advantage not to implement algorithms based on modular exponentiation.

The aim is to establish a secure channel between two entities eA and eB each belonging to two different groups A and B having each an identifier $ID^{Gr}_A$ and $ID^{Gr}_B$. Typically entities are smart phones, wearable devices as smart watches interfacing Internet Of Things (IoT) devices . . . All devices of a same group A or B is provided with a group key $K_A$ or $K_B$.

FIG. 1 shows an initialization phase during which each device eA and eB generates respectively a random R0A and R0B. Such an initialization phase is performed by all devices of all groups.

This random $R0i$ is then encrypted using the group key Ki in order to produce a cryptogram $C0i$. In the example given on FIG. 1, $C0i=AES[Ki](R0i)$.

An authentication token $T0i$ is then produced comprising the cryptogram $C0i$ and the random number $R0i$.

In the initialization phase, a secure channel is established using a classical technology in a step S00. In the presented example, a secure channel based on PKI is used. This step, which is generally time-consuming and anyhow more time-consuming than the invention, is done once. In the example given on FIG. 1, the provision of the first token, $T^0_B$ and $T^0_A$, of the other group B and A, identified by identifiers $ID^{Gr}_B$ and $ID^{Gr}_A$, is done by pair between two devices in a step S01. In practice other implementations can use a provision performed by a central group A authority establishing secure channels with any device from other groups B authorized to communicate with devices from the group A.

At the end of initialization phase, each device has received a token $T^0_i=[ID^{Gr}_i, C^0_i, R^0_i]$ from any other group it is intended to communicate with. When several tokens are successively received, the last is kept to serve at the next connections.

FIG. 2 shows schematically a token $T^N_i$ as stored after a N-th connection with an entity of the group i. This token $T^N_i$ has been generated by an entity ei of the group i. It comprises a random number $R^N_i$ which may contain hidden and non-forgeable information as an operation code (revocation, or certificate checking operation), a timestamp limiting the validity or starting the validity at a given date or a duration, a count.

In the given example, the random number $R^N_i$ comprises an operation code OPC, a random number RND and a time stamp or counter TS. The random number $R^N_i$ can be further encrypted before calculation of a cryptogram $C^N_i$ using the group key $K_i$ with the key of the originator of the RHA authentication token. The token $T^N_i$ comprises the random $R^N_i$ and the cryptogram $C^N_i$.

FIG. 1 also shows how the authentication operates during subsequent connections between the entity eA and the entity eB. In the example shown on FIG. 1, entity eA established previously N connections with an entity of the group B before requesting the connection with entity eB. The entity eB established, on its side, Z preceding connections.

In a step S10, the two entities exchange group identifiers. Entity eA sends the identifiers of its group IDGrA and symmetrically for entity eB. In a step S11, the two entities exchange the cryptogram they have for the group of which they received the identifier IDGr. Entity eA thus sends to entity eB the cryptogram $C^N_B$ and entity eB sends cryptogram $C^Z_A$ to entity eA.

In a step S12, both entities calculate, each on its side, the random corresponding to the received cryptogram. Entity eA uses the group A key $K_A$ to calculate $R^A_A=AES^{-1}[K_A](C^Z_A)$ and symmetrically for entity eB $R^Z_B=AES^{-1}[K_B](C^Z_B)$.

In step S13, a common session key $K^{NZ}_S$ is calculated, by entity eA from the calculated random $R^Z_A$ and from the random $R^N_B$ stored in the token $T^N_B$. This session key enables the establishment of a secure channel in a step S14.

In a step S15, the secure channel is used by each entity to transfer a newly calculated token $T^{N+1}_A$ and $T^{Z+1}_B$ to the other entity in order to allow a future authentication with another entity involving the same groups.

For the same authentication the ratio of performances between the RHA and a RSA is about ⅓000 then a basic RHA authentication requires 2000 CPU cycles corresponding to 3 times an AES lasting 100 μs for a 20 MHz frequency.

FIG. 3 shows a half authentication using the RHA authentication. Here for example the entity eB is a service provider and eA is a customer requesting a service necessitating to check an attribute of entity eA. For example this attribute is "over 18 years". If eA belongs to the attribute group, it would have the corresponding key $K_A$.

After the half authentication, only the entity eA is authenticated by entity eB by establishing a secure channel between both and checking a challenge. The exchange and check of the challenge enables the evidence that an authentic secure channel is established and that the checked entity owns the right group key as well as the right arborescence.

Entity eB was previously provided by the group A with a token $T_A=[C_A,R_A]$ stored by the entity eB in a step H0. To check the attribute, the provider eB sends the cryptogram $C_A$ as stored to entity eA in a step H1. Using the group key $K_A$, entity eA decrypts cryptogram $C_A$ in a step H2 and retrieve random $R_A$. In a step H3, entity eA then establish a secure channel using said random $R_A$ which is also the one stored in token $T_A$ in eB. This secure channel is then used to send said random $R_A$ for further check by entity eB as, thus, eB can compare $R_A$ with the one in $T_A=[C_A,R_A]$.

When an entity does not have the right token for the last level, it may do nothing then the progression within the arborescence of groups in a remote entity will stop.

Considering the speed of the RHA protocol, a recursive approach can be implemented by performing recursively a symmetrical RHA between nested groups as described in FIG. 4.

This last figure shows two devices D1 and D2, each device grouping several entities, each entity being associated to one group. In this example, device D1 comprises entities eA and eC while device D2 comprises entities eB and eD. Entity eA corresponds for example to a service registration attribute and entity eB to an "over 18" attribute. When device D2 need to check "over 18" attributes, it needs to recursively build secure channel using the RHA authentication at each level. On FIG. 4, two levels only are represented using two session keys $K^{AB}_S$ and $K^{CD}_S$ but much more levels could be implemented as the speed of RHA authentication is high.

By starting from the group encapsulating all other groups, the traceability (anonymity privacy property) is dependent on the cardinal of said group. The larger is the cardinal of the group, the highest is the performance related to non traceability.

Irrespective of the implemented protocol RSA/ECC or RHA, the recursive authentication into groups is required for ensuring the non traceability (surjection between an individual and a service having a large cardinal). The number of authentication is the same except the RHA is at least 3000 times faster than RSA/ECC. Nevertheless the number of exchanges is higher for the RHA than RSA/ECC.

Further alternative and advantageous solutions would, accordingly, be desirable in the art in order to reduce the number of exchanges. Indeed reducing the number of exchanges enables not to cancel the speed advantage of the RHA by wasting time in data exchanges which may be much longer than cryptography computations. It is particularly critical in contactless context like NFC. In such situation, using a small number or even a single exchange is crucial to reach acceptable duration of the authentication.

SUMMARY OF THE INVENTION

The present invention aims at reducing the duration of authentication while keeping at least a same level of security than the one provided using RHA principle while avoiding to share secret or to exchange large constants, as a RSA public key, which may compromise the privacy of the holder of the device representing the entity.

The present invention is defined, in its broadest sense, as a method, for a provider entity belonging to a provider group, to authenticate its belonging to an attribute provider group to a verification entity belonging at least to a consumer group and to an attribute verification group, in a non-traceable manner without necessitating to share secret or large constants compromising privacy, both entities comprising at least one attribute group arborescence, this attribute group arborescence being shared by the provider entity and the verification entity when the provider entity has the attribute, each group being authenticated by an authority that stores a group secret key into the entities under its authority, said method being characterized in that it comprises the preliminary step of providing each device from each group with a set of authentication tokens, one for each of the other groups with which the device is intended to communicate, said authentication token comprising at least a random number and a cryptogram of at least this random number by the secret key of each of these other groups;

said method further comprising the steps of, when a verification is triggered, for the verification entity, calculating a certificate from the attribute group arborescence, said certificate being calculated from the authentication tokens of the groups along the arborescence from the attribute verification group's token to the consumer group's token, establishing a secure channel based on the exchange of the cryptograms of the provider group and of the consumer group and sending the calculated certificate to the provider entity, for the provider entity, receiving and decrypting said certificate using the successive keys of the groups in the arborescence, using the decrypted random of the authentication token of the attribute provider group to establish an attribute level's secure channel with the verification entity.

Therefore, once RHA authentication tokens are provided by prior connection, the invention enables to perform a local verification of nested groups while limiting the number of exchanges. The communication of the certificate only enables to check all the arborescence on the consumer side and to reach the lowest level which is the one of the attribute. As soon as the attribute level can be reach using the certificate sent by the provider side, the authentication of the belonging of the provider to the attribute provider group is done. The establishment of the secure channel at the attribute level is thus possible.

As soon as the entity has the right arborescence and the right token at the last level, it can calculate a certificate according to the invention from the last level available and return it to the entity which sent the certificate and to which it tries to answer. Only one exchange is thus required.

According to an advantageous feature, a challenge is further exchanged once the attribute level's secure channel is established.

This feature enables to add a verification level relative to the authenticity of the devices by challenging the respective entities for checking that the secure channel is well established.

According to an advantageous embodiment, said method comprising a provision of a set of new authentication tokens for each level of the arborescence, this provision comprising the steps of calculating a token provisioner from the attribute group arborescence, said token provisioner being calculated, like the certificate, from the authentication tokens of the groups along the arborescence from the attribute provider group's token to the provider group's token, sending the token provisioner through the secure channel to the verification entity, for the verification entity, receiving and decrypting said token provisioner using the successive keys of the groups in the arborescence, storing the extracted new authentication tokens at each levels after decryption.

This embodiment enables to renew authentication tokens of the RHA at each connection using the certificate. Authentication tokens being embedded at each level during the calculation, they will be extractable only by the corresponding level on the provider side. Any consumed provider token is then replaced on the provider side. Elements of the tokens are added as additional parameters in the certificate.

In a preferred implementation, said certificate is calculated for each group from lower group data in the arborescence, said data including at least the identifier of the lower group, the cryptogram of the lower group and, except for the attribute verification group, the previously calculated certificate for the lower group, said calculation including the encryption of at least the identifier of the lower group, the cryptogram of the authentication token for the lower group and the certificate of the lower group using the random number of the authentication token of the group.

This specific calculation of the certificate enables to transfer all data to be checked on the consumer side while protecting the transferred data and to chain the calculation of the certificate while providing to the next level all data required for pursuing the calculation.

Advantageously, additional parameters are introduced in the certificate.

The possibility to add such additional parameters transferred to the corresponding level only enables a great number of functions to be activated with the invention: revocation, token provisioning, information on the transaction concerned by the authentication . . .

More particularly, said additional parameters can be chosen among the group constituted by: new authentication token, specific operation code, revocation code, certificate checking code, addition of groups code, transaction parameters such as validity checking, payment amount, agency identifier, transaction role, timestamps limiting the validity, timestamps starting the validity at a given date, a duration, a count.

All of these additional data are confidential per group and cannot be decrypted by upper and lower groups in the given arborescence. These additional parameters enable to monitor the availability of the entities inside the whole system. Any useful information dedicated to a given group in the arborescence can thus be provided.

According to a specific feature of the invention, the lower group being associated to an attribute identifier, the method comprises the step of, if the attribute identifier is unique or not ambiguous in the scope of an application, for the attribute provider group, accepting the request or denying it.

Once the lower group is reached by the certificate, this group can answer that it owns this attribute or not. It can thus accept or deny the request as included in the certificate. To accept it, it builds a secure link with the corresponding group in the other device using the random as received in the cryptogram. To deny it, it can do nothing or build a secure link with one of the previous groups in the arborescence to transmit a deny message. Other deny procedure not using the RHA principle can also be implemented.

In a particular implementation, the acceptance or deny is decided in relation with a user's agreement or policy according to an application profile.

The verifier and the prover shall share the same arborescence for getting a given attribute. The above implementation enables to condition the acceptance or deny of the attribute authentication according to externally provided information associated to an application profile.

The present invention also relates to a device comprising means to execute the method. The invention thus further relates to a device comprising a provider entity belonging to a provider group and able to authenticate its belonging to an attribute provider group to a verification entity belonging at least to a consumer group and to an attribute verification group, in a non-traceable manner without necessitating to share secret, said provider entity comprising at least one attribute group arborescence, this attribute group arborescence being shared by the provider entity and the verification entity when the provider entity has the attribute, each group being authenticated by an authority that stores a group secret key into the entities under its authority, said provider entity being provided with a set of authentication tokens, one for each of the other groups with which the device is intended to communicate, said authentication token comprising at least a random number and a cryptogram of at least this random number by the secret key of each of these other groups;

said provider entity being able to establish secure channels with the verification entity;

said provider entity being further able to, when a verification is triggered, receive, via a secure channel based on the exchange of the cryptograms of the provider group and of the consumer group, a certificate calculated from the attribute group arborescence by the verification entity, said certificate being calculated from the authentication tokens of the groups along the arborescence from the attribute verification group's token to the consumer group's token, said provider entity further comprising a decryption unit to decrypt said certificate using the successive keys of the groups in the arborescence, said provider entity being further able to establish an attribute level's secure channel with the verification entity using the decrypted random of the authentication token of the attribute provider group.

Such a device is for example the device of a user willing to inform a certificate consumer device of its belonging to the group having a given attribute.

The invention further relates to the other kind of device consuming the certificate. It thus relates to a device comprising a verification entity belonging to a consumer group and to an attribute verification group, said verification entity being dedicated to verify the authentication of the belonging to an attribute provider group of a provider entity, said verification entity comprising at least one attribute group arborescence, this attribute group arborescence being shared by the provider entity and the verification entity when the provider entity has the attribute, each group being authenticated by an authority that stores a group secret key into the entities under its authority, said verification entity being provided with a set of authentication tokens, one for each of the other groups with which the device is intended to communicate, said authentication token comprising at least a random number and a cryptogram of at least this random number by the secret key of each of these other groups;

said verification entity comprising calculation means to calculate a certificate from the attribute group arborescence, said certificate being calculated from the authentication tokens of the groups along the arborescence from the attribute verification group's token to the consumer group's token, said verification entity being able to establish secure channels with the provider entity;

said verification entity being further able to, when a verification is triggered, send the calculated certificate via a secure channel based on the exchange of the cryptograms of the provider group and of the consumer group, said verification entity being further able to establish an attribute level's secure channel with the verification entity using the decrypted random of the authentication token of the attribute provider group.

Such a device is for example the device of a policeman or of a doctor willing to check that the user of the other device has a driving license or, respectively, allergies. To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIGS. 5A and 5B give two different visual representations of the attribute structures necessary for the implementation of the invention;

FIG. 6 shows schematically the process of calculation of a certificate of the invention;

DETAILED DESCRIPTION OF EMBODIMENTS OF THE INVENTION

Figure 1:
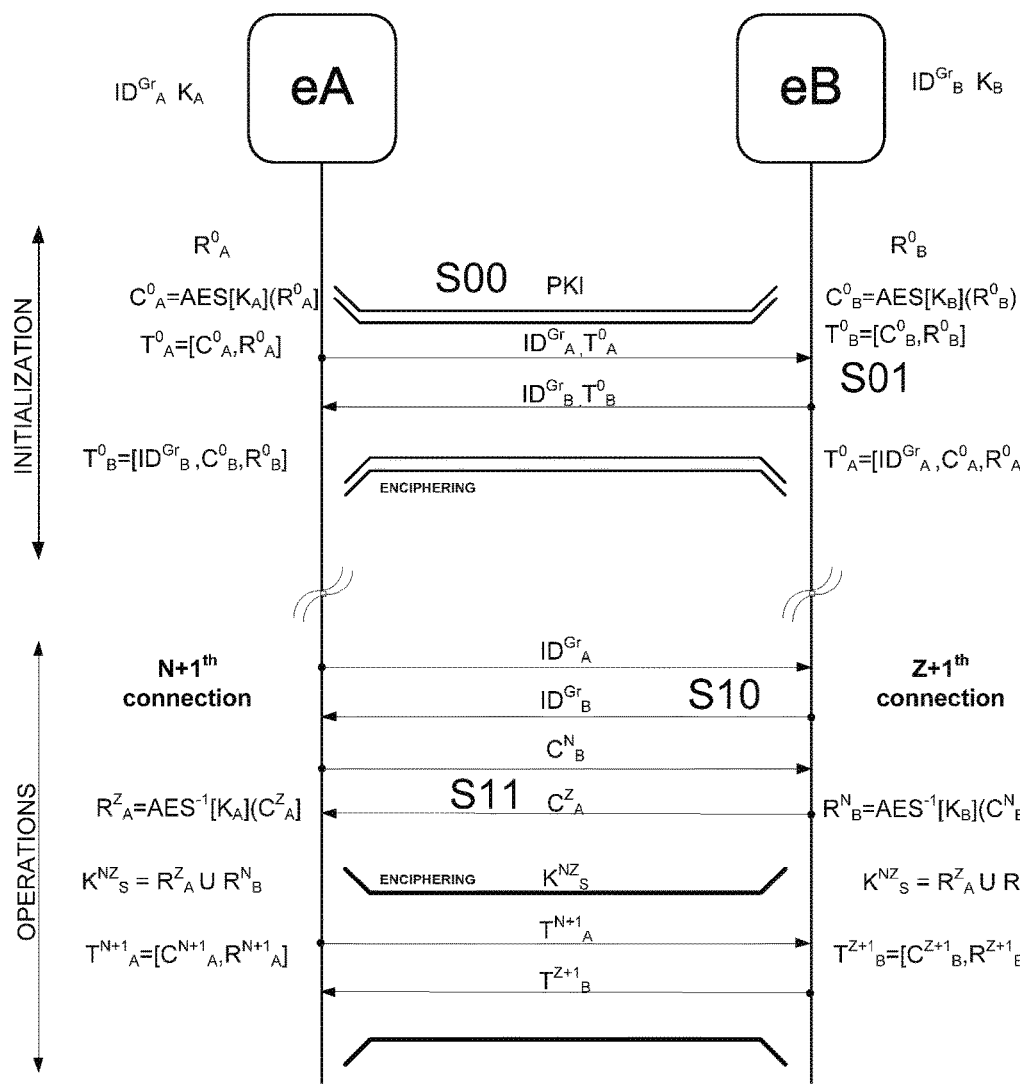
FIG. 1 shows schematically the context and the functioning of Random Handback Authentication (RHA)
Figure 2:
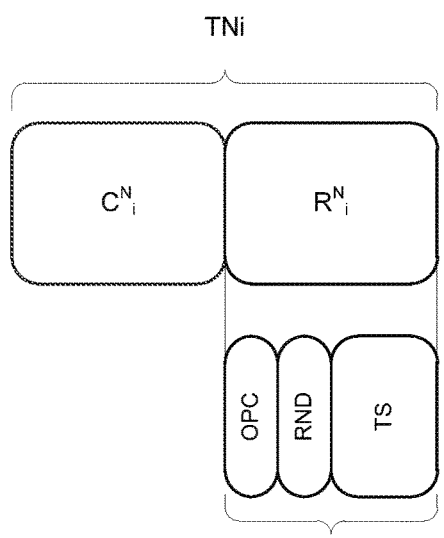
FIG. 2 shows schematically the structure of an authentication token as used in the RHA context.

For a more complete understanding of the invention, the invention will now be described in detail with reference to the accompanying drawing. The same elements have been designated with the same reference numerals in the different drawings. For clarity, only those elements and steps which are useful to the understanding of the present invention have been shown in the drawings and will be described.

The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

On a general point of view, the RHA authentication uses an enciphering algorithm which may be chosen among the available ones. AES algorithms are typically used to calculate the cryptogram according to the RHA principles.

Advantageously an AES-CBC (Cipher Bloc Enciphering) algorithm as defined in RFC 3602 is used for encrypting/decrypting a message having any length by a secret key. The invention makes use of such an algorithm.

The invention proposes to generate an RHA certificate which is a combination of algorithm performing a message enciphering as the AES-CBC and the RHA half authentication.

The AES-CBC is the Cipher Bloc Ciphering of the message M by the key K, noted as followed:

$$CBC_K{}^M = AES\text{-}CBC[K](M)$$

Then the reverse operation is:

$$M = AES\text{-}CBC^{-1}[K](CBC_K{}^M)$$

The invention is based on the existence of nested groups or, in an equivalent representation, of an arborescence of groups. FIGS. 5A and 5B show such equivalent representations. FIG. 5A shows nested groups $G_D$ and $G_C$ nested in a group $G_B$ itself nested with another group $G_E$ in a group $G_A$. Group $G_E$ further includes a group $G_F$. FIG. 5B shows the same groups' structure but as an oriented graph arborescence.

Let now assume a group $G_N$ having a group key $K_{GN}$ and the sub-group of $G_N$ as $G_{N-1}$.

According to the preferred implementation of the invention, the certificate $M_{GN}$ of $G_{N-1}$ by $G_N$ is recursively calculated as follows:

$$M_{GN} = \lfloor ID_{GN}, C_{GN}, CBC_{R_{GN}}{}^{M_{GN}} \rfloor$$

With:

$$CBC_{R_{GN}}{}^{M_{GN}} = AES\text{-}CBC[R_{GN}](CBC_{R_{GN-1}}{}^{M_{GN-1}}, ID_{GN-1}, C_{GN}, [\text{Additional parameters}])$$

Figure 3:
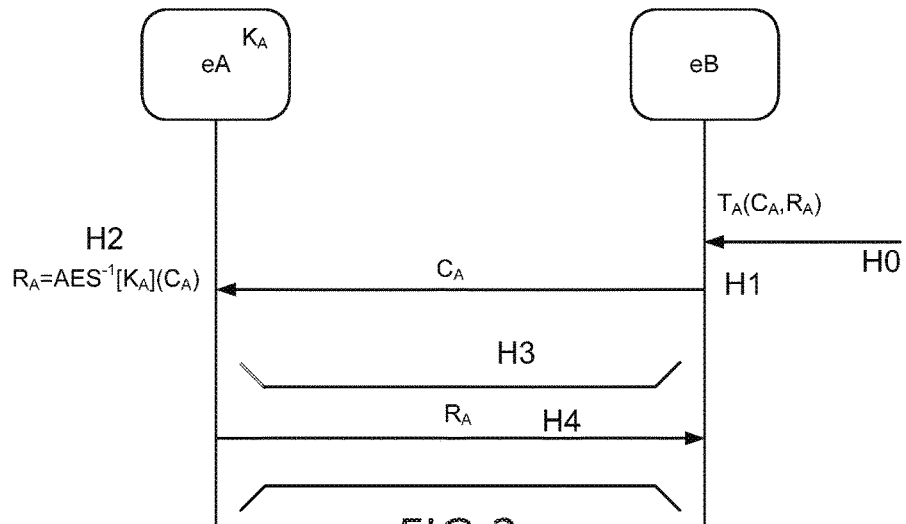
FIG. 3 shows an half authentication situation using RHA.
Figure 4:
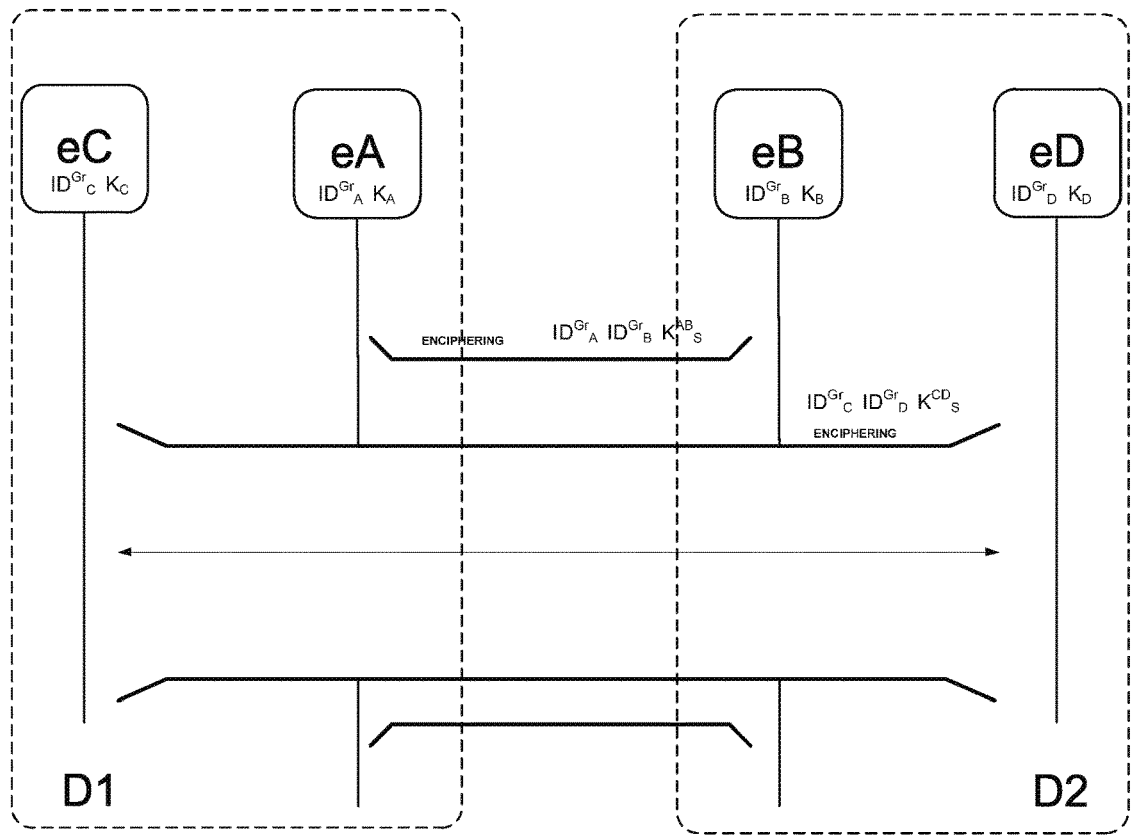
FIG. 4 shows a recursive authentication standing on two successive levels.

While using the terminology used in description of FIG. 3, this operation can be done recursively within consumer groups noted $G_{CX}$ from the lowest group to the highest group, which is the group including all sub-groups, by using the RHA authentication token $T_{PX}$ from corresponding provider groups noted $G_{OX}$. Such consumer groups are the ones to which a verification entity belongs. In the following description of FIGS. 6, 7 and 8, the verification entity is designated by the terms consumer entity as it consumes the authentication tokens of the provider entity to check the belonging of the provider entity to the attribute provider group and to authenticate this belonging. However, it is here noted that this notation is a question of convention as usage of the certificate is symmetric. The relative character of the denomination consumer/provider will appear in the following, a consumer is then a provider in a symmetrical application of the invention. This denomination is indeed relative to the attribute provision/verification.

The recursive calculation of the certificate according to the invention is schematically shown on FIG. 6 for three levels.

Figure 7:
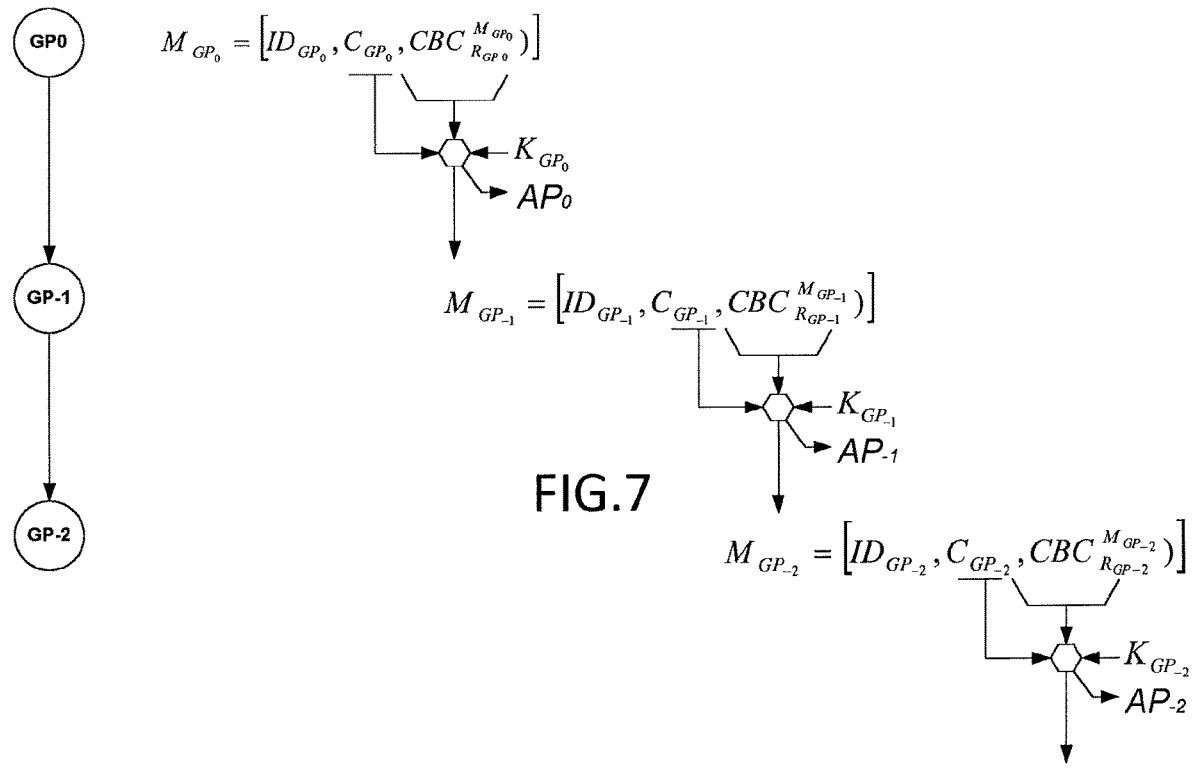
FIG. 7 shows schematically the process of verification of the certificate of the invention.

On FIGS. 6 and 7, $C_{GPN}$ is the current cryptogram of the RHA Authentication Token of the provider group GPN which will receive the certificate, $R_{GPN}$ is the current random of the RHA Authentication Token of the group GPN recipient of the certificate, $M_{GPN}$ is the certificate of the group and $ID_{GPN}$ is the identifier of the group. $C_{GPN}$ and $R_{GPN}$ can be provisioned during prior connection and can be typed for being used only for certificate operations.

In this last case, any group of any levels will have at least two kinds of tokens: the ones dedicated to one-to-one group authentication and the ones dedicated to certificate authentication.

As shown on FIG. 6, the lowest level GC-3 on the consumer side, which is the level of the attribute to be checked and so which is the attribute verification group, transmits a certificate $M_{GP-3}$ comprising at least a provider group identifier of the lowest level $ID_{GP-3}$ and the provider cryptogram of the lowest level $C_{GP-3}$ to the next level GC-2.

The cryptogram $C_{GP-3}$ and the group identifier $ID_{GP-3}$ are used by the level GC-2, optionally completed with additional parameters $AP_{-2}$ to calculate a cipher bloc $CBC_{R_{GP-2}}{}^{M_{GP-2}}$ using a function CBCF and the random $R_{Gp-2}$ of the provider group $G_{P-2}$.

Cipher bloc $CBC_{R_{GP-2}}{}^{M_{GP-2}}$ consumer group identifier $ID_{GP-2}$ and consumer group cryptogram $C_{GP-2}$ forms the certificate $M_{GP-2}$ to be transmitted to level GC-1.

This next level GC-1 adds optionally additional parameters AP-1 to the certificate $M_{GP-2}$ before calculating a next cipher bloc $CBC_{R_{GP-2}}{}^{M_{GP-2}}$ using a function CBCF and the provider group random $R_{GP-1}$.

The certificate $M_{GP-1}$ is then constituted with this cipher bloc $CBC_{R_{GP-2}}{}^{M_{GP-2}}$, the corresponding provider group identifier $ID_{GP-1}$ and the cryptogram $C_{GP-1}$ of the current level. It is transmitted to next upper level GC0.

At this level, which is the highest, additional parameters AP0 are advantageously added to the certificate $M_{GP-1}$ before calculating a cipher bloc $CBC_{R_{GP0}}{}^{M_{GP0}}$ using again a function CBCF. Then the provider group identifier $ID_{GPC0}$ and the corresponding cryptogram $C_{GP0}$ are added to the cipher bloc $CBC_{R_{GP0}}{}^{M_{GP0}}$ to constitute the certificate $M_{GP0}$ to be transmitted to a device of the consumer group GP0.

Then according to the principles of the invention, the provider of the attribute corresponding to the lowest level is here thus on a provider side and can extract from the certificate passed by the upper consumer group the data for performing the certificate decryption and passes the sub-certificate to the sub-group under its control.

At each level indicated by the successive group identifiers, the provider entity extracts the group identifier of the next addressed group and deduces the key of the group for decrypting the cryptogram and gets the random as the decryption key for the cipher bloc to be decrypted.

The decryption is performed from the group encapsulating all the others towards the lowest one. The decoding is performed in the opposite direction than the certificate generation from the highest group to the lowest group. The checking of the authenticity of the certificate can be done at each provider group corresponding to a level in the arborescence. It is done by verifying the availability of the sub-group of identifier $ID_{GPN-1}$ because the probability to decrypt an available sub-group identifier from a wrong decrypted key $R_{GPN}$ is highly improbable. It can be further completed by checking an additional parameter noted APX provided by each consumer group GCX and dully decrypted by each counterpart provider group GPX. Typically, integrity can be further controlled using a checksum, a code or a given constant known by the provider side, typically integrated in the certificate as an additional parameter.

The detailed decryption of the certificate $M_{GP0}$ on the provider side is illustrated on FIG. 7. First, the cryptogram $C_{GP0}$ is extracted from $M_{GP0}$. Using the group key $K_{GP0}$, it is decrypted giving $R_{GP0}$. The obtained $R_{GP0}$ is then used to decrypt the cipher bloc $CBC_{R_{GP0}}{}^{M_{GP0}}$.

The following formula summarizes this step: $CBC_{R_{GN-1}}{}^{M_{GN-1}}$, $ID_{GN-1}$, $C_{G_{N-1}}$, [Additional parametered]= AES–CBC$^{-1}$[AES$^{-1}$[$K_{GN}$]($C_{G_N}$)]($CBC_{R_{GN}}{}^{M_{GN}}$) The additional parameters AP$_0$ are thus extracted as well as $ID_{GP-1}$, $C_{GP-1}$ and the cipher bloc $CBC_{R_{GP-1}}{}^{M_{GP-1}}$. The three last parameters are then transferred to the group identified by $ID_{GP-1}$, they constitute the certificate $M_{GP-1}$.

In group GP-1, the cryptogram $C_{GP-1}$ is decrypted using the group key $K_{GP-1}$. The obtained random is then used to decrypt the cipher bloc $CBC_{R_{GP}}{}^{M_{GP-1}}$. Here additional parameters AP$_{-1}$ for this level GP-1 are extracted as well as $ID_{GP-2}$, $C_{GP-2}$ and $CBC_{R_{GP-1}}{}^{M_{GP-1}}$.

Again the three last parameters are used to generate a new certificate $M_{GP-2}$ dedicated to be transferred to the last level GP-2.

At last, at level GP-2, the cryptogram $C_{GP-2}$ is decrypted and the obtained random $R_{GP-2}$ is used to decrypt the cipher bloc $CBC_{R_{GP-2}}{}^{M_{GP-2}}$. As no cipher bloc is present, the level GP-2 is informed that it is the lowest level corresponding to the required attribute. It can however receive additional parameters AP$_{-2}$ as preceding levels in the certificate.

By concatenating additional parameters after the parameters mandatory for the invention, each group has the possibility to convey additional information/operations. Typically such additional parameters relate to revocation, addition of groups, transaction parameters . . . Such transaction parameters are, for example, validity checking, payment amount, agency identifier, role . . . The additional parameters added in a certificate shall be chosen in such a way to no disclose any information revealing a possible identity by correlation. Typically large constants should be avoided.

Figure 8:
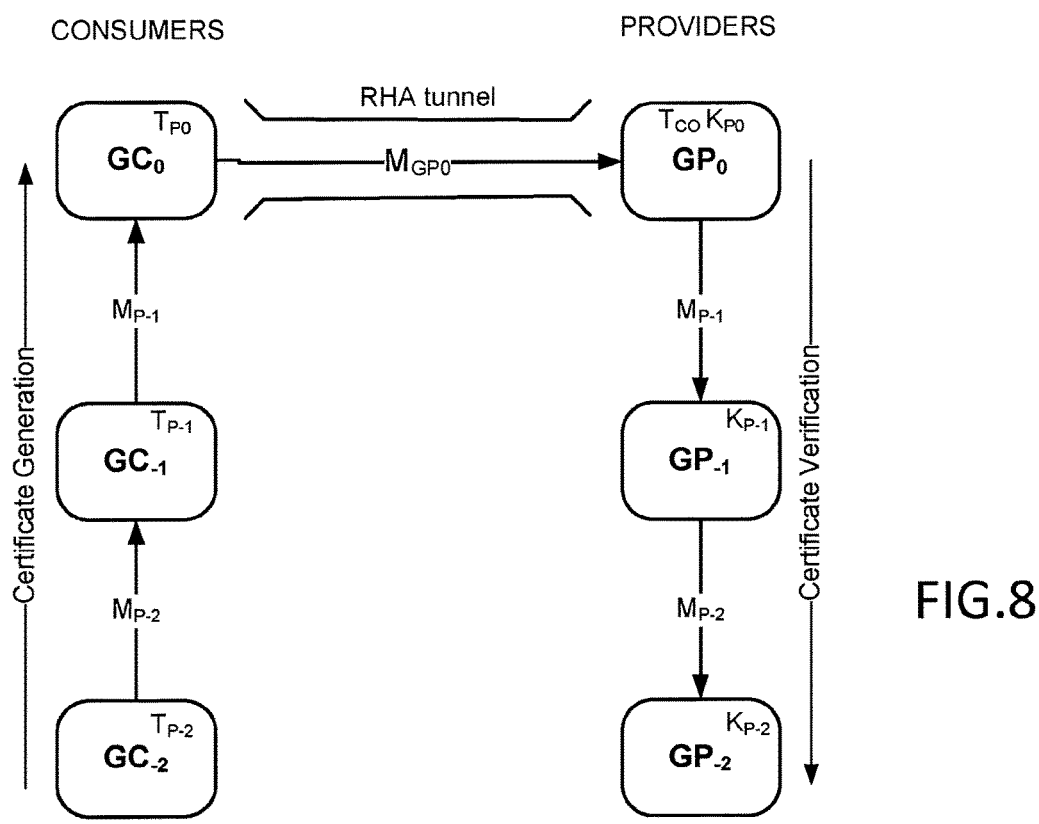
FIG. 8 summarizes the principle of an exchange using a certificate according to the invention.

FIG. 8 summarizes the generation, the transmission and the verification of a certificate in a context where a consumer needs to check that a provider has an attribute. Using the provider side's tokens $T_{P-2}$, $T_{P-1}$, $T_{P0}$ as stored at each level of the consumer's groups, subsequent certificates $M_{GP-2}$, $M_{GP-1}$, $M_{GP0}$ are calculated at each level GC-2, GC-1, GC0.

An RHA tunnel is then constructed using the consumer's token $T_{C0}$ and the provider's token $T_{P0}$. It enables the transfer of the certificate $M_{GP0}$ of the highest level to the highest provider group GP0. As it has the group key $K_{GP0}$ enabling the decoding of the certificate $M_{GP0}$, the certificate can be decrypted. A certificate of a lower level $M_{GP-1}$ is thus extracted which will be decoded at the level GP-1. This level will at last provide an extracted lowest level certificate $M_{GP-2}$ to level GP-2 which is the attribute provider group.

As soon as the certificate $M_{GP-2}$ is decoded, a secure channel can then be established between groups GP-2 and GC-2 using the provider random stored on the consumer side and the random decrypted on the provider side. A new token for this level can thus be provided. For other levels, it is later described how new tokens can be provisioned using the invention.

For the need of the invention, the AES shall be protected against usual attacks as the Padding Oracle attacks, fault attacks and side Channel attacks.

The two first groups of attacks can be partially prevented by using a HMAC. Any fault in the AES computation or any bit changed in the $C_{GN}$ will be detected by the HMAC (HC$_{GN}$). The HMAC uses a diversified key KD$_{GN}$ in order not to disclose any information about the secret key $K_{GN}$.

Figure 9:
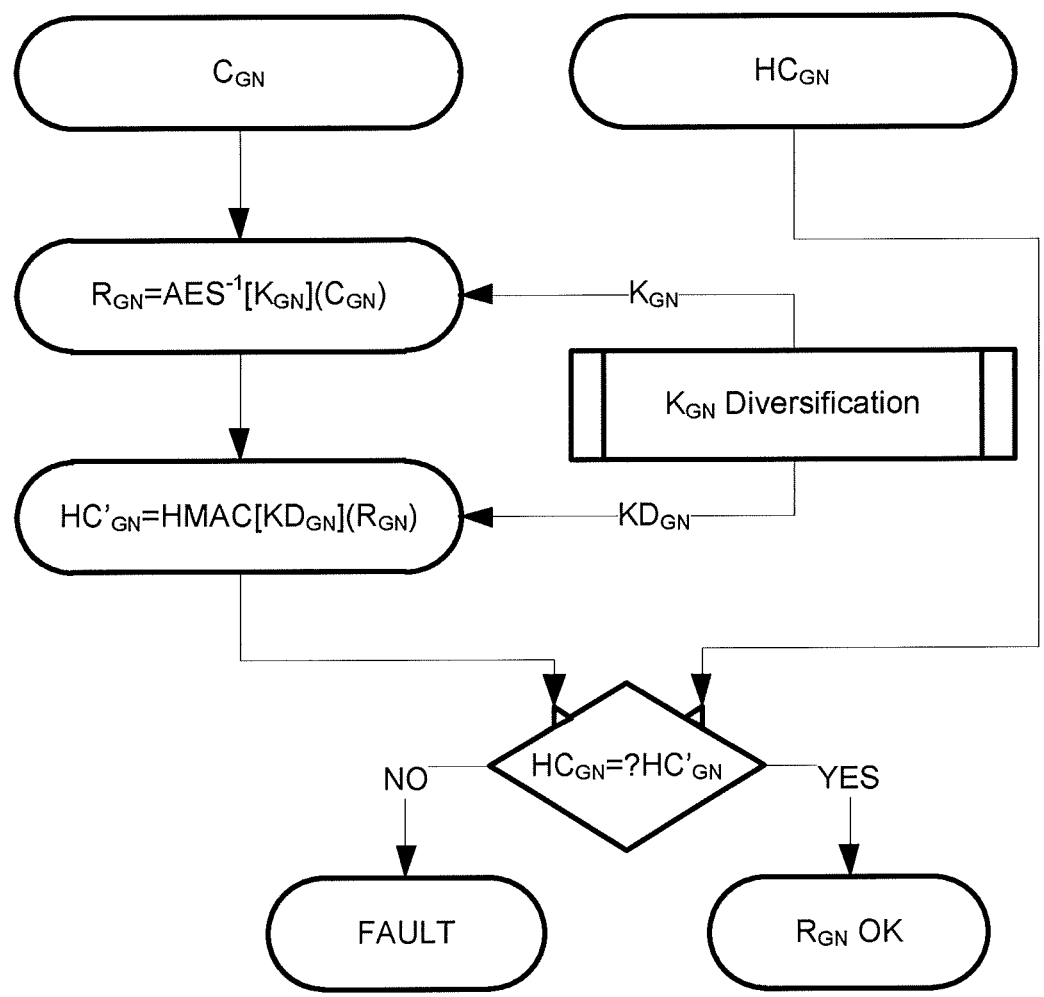
FIG. 9 schematically shows how an integrity check can be implemented in order to detect attack on the cryptogram.

An illustration of the implementation of a check by HMAC on $C_{GN}$ is given on FIG. 9. On this figure, it is shown how a received HMAC of $C_{GN}$ HC$_{GN}$ is checked in regards with an internally calculated HMAC calculated by the receiving entity for preventing basic attacks as the "Padding Oracle" attack.

The internal calculation of the HMAC includes a decryption of the received cryptogram $C_{GN}$ using the group key $K_{GN}$, a re-encryption of a new cryptogram $C'_{GN}$ calculated from the obtained random $R_{GN}$ using a diversified key $KD_{GN}$ obtained from group key $K_{GN}$. The HMAC properties enable to have a direct check between the recalculated $HC'_{GN}$ and the received $HC_{GN}$.

Protections against usual attacks (e.g. Padding Oracle attacks) for any intergroup exchanges are advantageously used when an RHA certificate is implemented. As well the AES-CBC shall be protected by the addition of an HMAC.

The AES protection highlights additional data advantageously added in the certificate or during the establishment of the RHA tunnel for protection of the group secret keys.

The following table summarizes the comparison between the RHA and the RSA in terms of public/private key definition, certificate, time/count limitation and authentication time.

| Features | Support | RHA | Support | RSA |
|---|---|---|---|---|
| Public key | Yes | IDGROUP, CNGROUP | Yes | KPU, Module |
| Private key | Yes | RNGROUP | Yes | KPR, Module |
| Certificate | Yes | RHA certificate | Yes | FIPS 196 |
| Time/count limited | Yes | Time/count encrypted in the challenge | Yes | FIPS 196 |
| Authentication time | NA | 100 μs@20 MHz-AES 128 bit | NA | 560 ms@20 MHz RSA 2048 bit |

It can be seen that the authentication time can be drastically reduced with the invention.

The following more precisely discloses the use of the invention in the context of an offline attribute authentication. This context assumes the existence of two main groups: the providers of attributes and the consumer of attributes. Those roles are not fixed and relative to the attribute requester/consumer and the attribute provider.

Any devices from these groups have subscribed with their respective attributes authority for the installation of an attribute group duly identified and encapsulated into a group controlled by the attributes authority.

The attributes authority of the provider's side may deny the access of the attributes authority of the consumer's side. Secure channels between both sides can be proprietary or regulated by a standard.

The two attributes authorities may exchange their respective RHA authentication tokens corresponding to associated attributes which will be provisioned into dully identified groups respective to their association with an attribute, for example blue eyes, birthday, weight, gender, number of children . . . .

Figure 10:
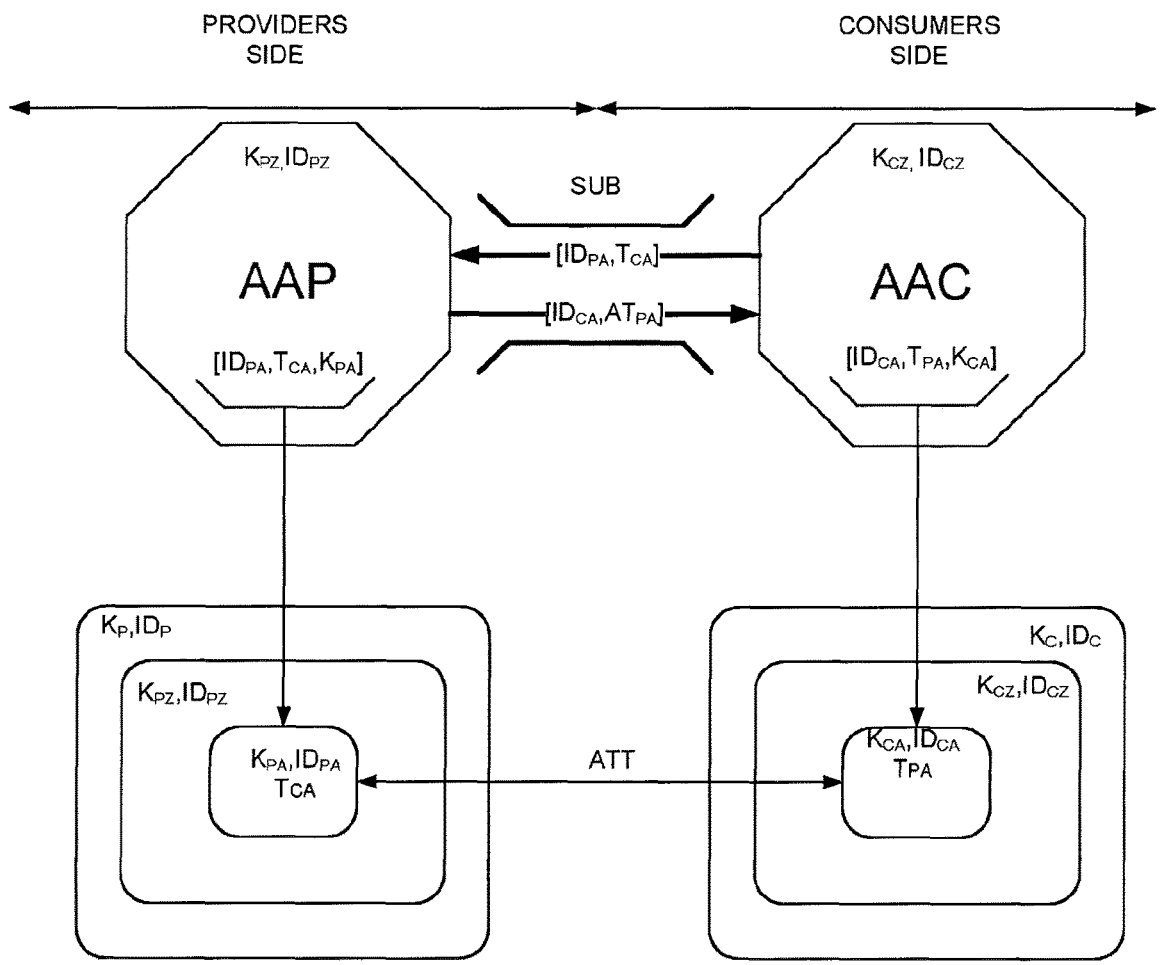
FIG. 10 illustrates the attributes' provisioning.

The attribute provisioning is illustrated on FIG. 10. Each consumer and provider side has an attribute authority.

The attribute authorities AAP and AAC are each provided with attribute identifiers $ID_{PA}$ and $ID_{CA}$ and respectively with the authentication token $T_{CA}$ and $T_{PA}$ by other attribute authorities.

On the provider side, the attribute authority AAP has the identifier $ID_{PA}$, the token $T_{CA}$ of the other side and the key $K_{PA}$ used to calculate the token $T_{PA}$ sent to the other side. The key $K_{PA}$ is then the group key for the attribute level group on the provider side. A corresponding nested group is provisioned with this key $K_{PA}$ associated to the attribute identifier $ID_{PA}$ and the token $T_{CA}$. A new group is thus created on the provider side for the attribute to be managed.

On the consumer side, the attribute authority AAC has the identifier $ID_{CA}$, the token $T_{PA}$ of the other side and the key $K_{CA}$ used to calculate the token $T_{CA}$ sent to the other side.

The key $K_{CA}$ is then the group key for the attribute level group on the consumer side. A corresponding nested group is provisioned with this key $K_{CA}$ associated to the attribute identifier $ID_{CA}$ and the token $T_{PA}$.

It can be seen that the attribute group is nested in previous groups on both sides. Then, using the tokens, the attribute groups on both sides are able to establish a secure channel directly as soon as the above levels are previously connected.

For off-line attributes authentication, the provider and the consumer shall host in their respective secure elements the same hierarchy of groups for accessing an attribute by doing a recursive RHA authentication from the top group up to the attribute group. Such hierarchy is for example of the kind shown on FIGS. 5A and 5B. With this hierarchy, the authentication path is the list of all group identifiers from the root when arborescence is used to structure the hierarchy or from the group encapsulating all the other groups when nested groups are used. Authentication path are given in the table below.

| Group identifier | Authentication path |
|---|---|
| $G_A$ | $G_A$ |
| $G_B$ | $G_A.G_B$ |
| $G_C$ | $G_A.G_B.G_C$ |
| $G_D$ | $G_A.G_B.G_D$ |
| $G_E$ | $G_A.G_E$ |
| $G_F$ | $G_A.G_E.G_F$ |

Figure 11:
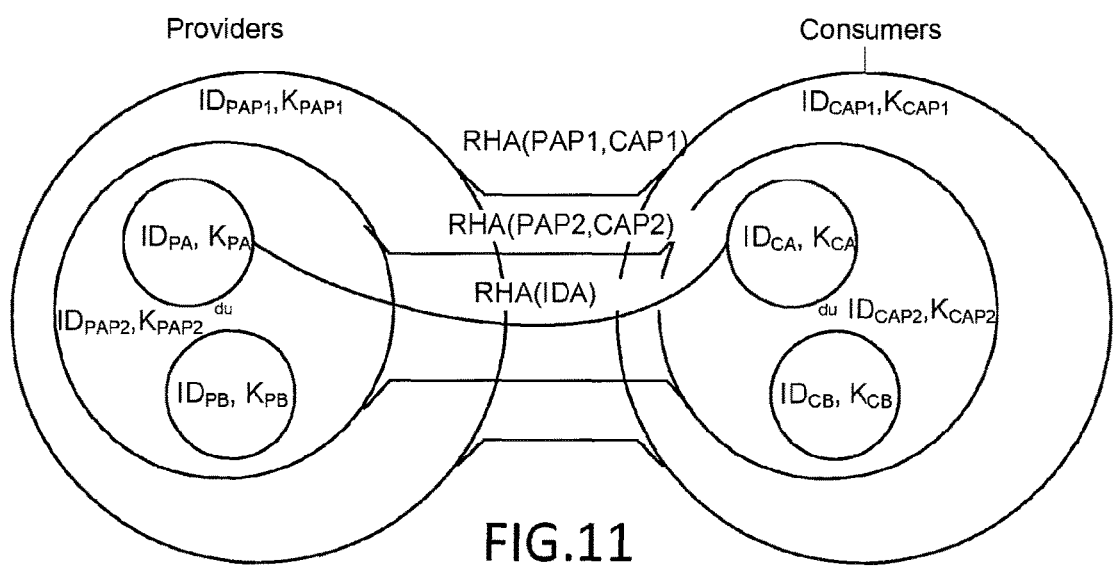
FIG. 11 schematically shows attributes groups on both sides of a transaction.

The provider may accept the request or deny it, typically when a negative user's agreement or policy according to an application profile applies. The situation after acceptation of the request is shown on FIG. 11 where successive secure channels are established between successive nested groups to the last one identified by $ID_{PA}$ and $ID_{CA}$ and using, respectively key $K_{PA}$ on the provider side and $K_{CA}$ on the consumer side. On this figure, two attributes A and B having the same level are shown, for example two vaccination status for a medical application.

Figure 12:
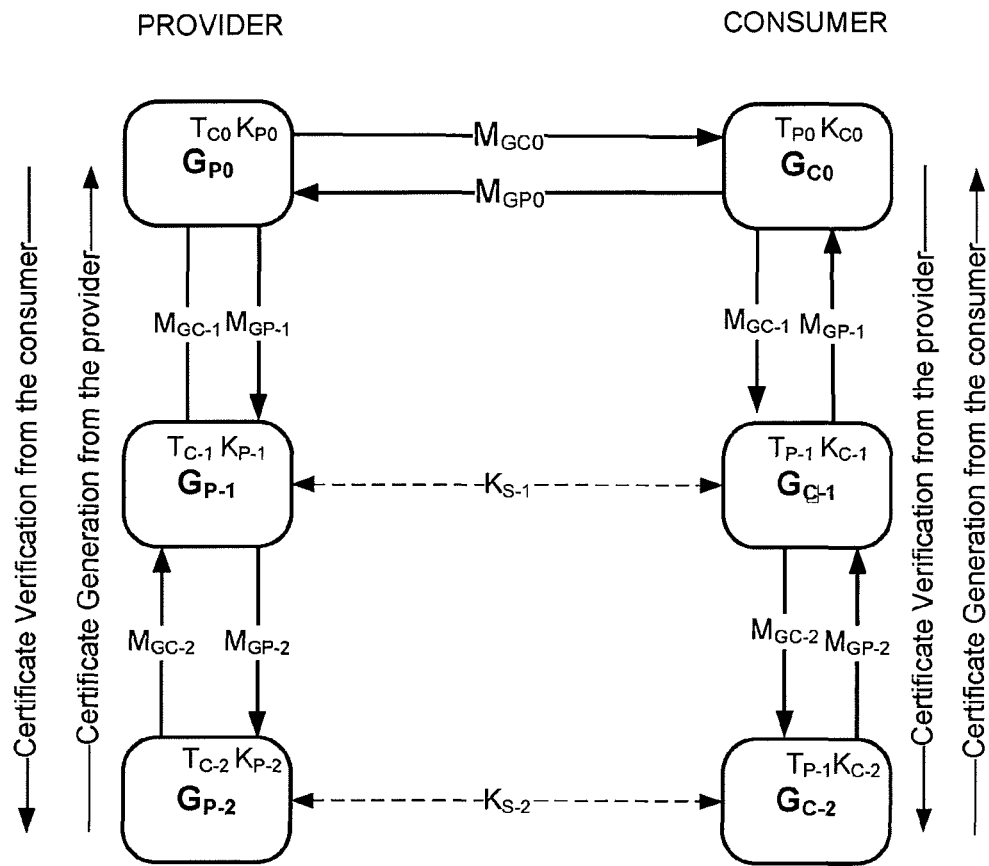
FIG. 12 schematically shows the regeneration of tokens using certificates of the invention.

Then, in case the request is accepted, the provider may send a RHA certificate to the consumer. This certificate can be pre-computed. FIG. 12 schematically shows such a reply using a symmetric certificate. Here, even if provider and consumer sides are identified, when the provider answers by sending back a certificate, it is indeed, this time, a consumer in the meaning of the invention. It is here understood that the denomination is relative to the attribute verification and does not refer to technical differences.

In a preferred implementation, the consumer shall send back the equivalent pre-computed certificate using the same authentication path for regenerating the RHA authentication tokens consumed by the provider certificate.

In answer to the certificate received from the consumer side, intermediate certificates $M_{GC-2}$, $M_{GC-1}$ are thus calculated using the consumer tokens as stored on each level of the provider side.

The secure channel established to transfer the upper level certificate is used to transfer the thus calculated new certificate from the provider side to the consumer side. Certificate decryption is then performed on the consumer side from the upper level to the lowest one. A bidirectional exchange of certificate is thus performed.

The exchange of certificates shown on FIG. 12 can be used for the regeneration of tokens after certificate decryption. New tokens are calculated on each level on the provider side and these tokens are introduced in the recursive generation of a certificate $M_{GC0}$ with calculation similar to the one above described.

It is here noted that, ideally, the first certificate calculated on the consumer side also includes new authentication tokens for the consumer side to be decrypted and stored on the provider side after use of the previously available and stored authentication tokens.

Tokens are introduced as additional parameters in a calculation scheme as shown on FIG. 6.

At each group level, a common session keys (KS-1, KS-2 . . . ) can be computed by using RGN deduced from CGN and the respective group keys. Each level can perform a mutual authentication by exchanging defined information encrypted by the session key for checking the control of respective group keys. As seen above, the additional parameters within the certificate related to each level, may convey the new RHA tokens for a subsequent transaction/connection.

Any attributes authority may convey within the additional data of the RHA certificate a set of commands for deleting/revoking a group, adding a group, changing a group key, deleting RHA Authentication tokens, adding RHA Authentication Tokens etc.

The authenticity, integrity and confidentiality of these operations shall be protected in order to avoid deny of services and cannot use secrets within the secure element to update. For these operations, the secure element will use an Asymmetric Encryption as the RSA or the ECC and a public key.

The certificate can be retrieved from the authority server or during the connection to another secure element by using a principle named viral propagation described in the previously filed RHA authentication patent application. According to this viral propagation, operations encapsulated by attributes authorities into a certificate can be propagated from secure elements of the provider/consumer side by using the secure elements of consumer/provider side. The encapsulated operations dully tagged can be append to the additional data of any certificates and propagated to secure element having no connectivity means. The propagation can be limited in time of an hop count.

Figure 13:
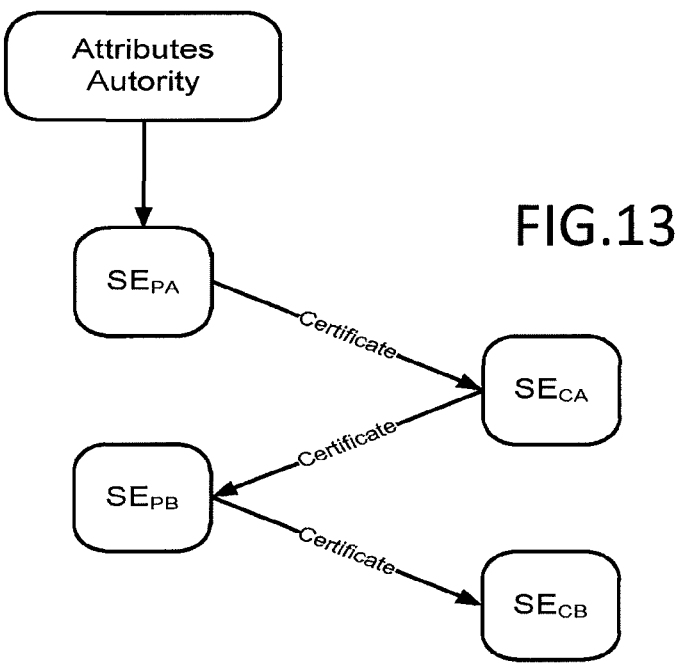
FIG. 13 illustrates the viral propagation using the invention.

FIG. 13 illustrates this viral propagation where additional parameters are transferred from the attribute authority once to a secure element SEPA. This secure element then connects with a consumer side secure element SECA which itself connects later with a provider secure element SEPB. This provider secure element is thus provided with the additional parameters. This figure only shows a linear propagation but, as soon as, the secure element SECA can connect to many other provider secure element, this principle is rapidly growing leading to a viral always faster propagation.

The invention also enables to control the life cycle of the secure element including groups' ownership. Indeed, the SE has a single group at the initialization controlled by the SE maker. The subsequent groups are joined by using the principle related to the Addition & Revocation of groups as explained earlier.

The invention further enables to do indirect disclosure of attributes. All attributes have a group identifier. Then the availability of the group shall not indeed disclose any information about the availability of the attribute. The connection of a provider attribute group with a consumer attribute group can only express the availability of the attribute.

The non connection to a consumer attribute group from a provider attribute group can express the non availability of the attribute or the non acceptance to disclose an available attribute, for example if the user does not agree to disclose it or in respect of a policy.

By completing the RHA certificate protocol between two groups sharing the same attribute on the provider and consumer sides, then the provider brings the evidence about the authenticity of an attribute related to the authentication path involved in the recursive authentication.

It is here noted that a same attribute on a user point of view, for example the gender male/female, can be present in several arborescences. In this case corresponding groups in arborescences will have different attribute identifiers and different corresponding keys according to the RHA principles. The same attribute may thus have different authentication paths to be checked.

Besides the attribute identifier is unique or not ambiguous in the scope of an application and enables the attribute provider group to accept or deny a request of attribute provision. The acceptation or deny is advantageously decided in relation with a user's agreement or policy according to an application profile.

The Attribute authority may filter the consumers for conditionally granting the access to an attribute. This is illustrated on FIGS. 14A and 14B.

Figure 14A:
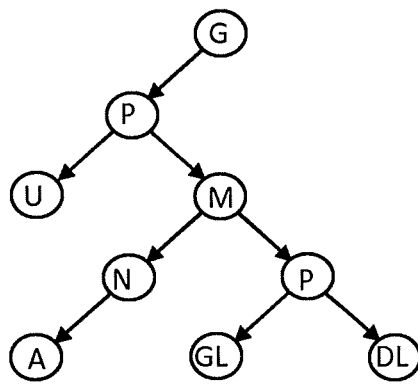
FIGS. 14A and 14B show schematically role filtering issues in the context of the invention.
Figure 14A:
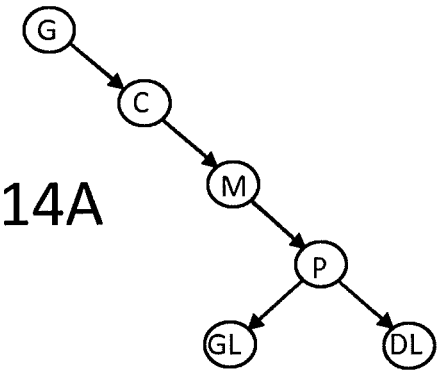
Figure 14B:
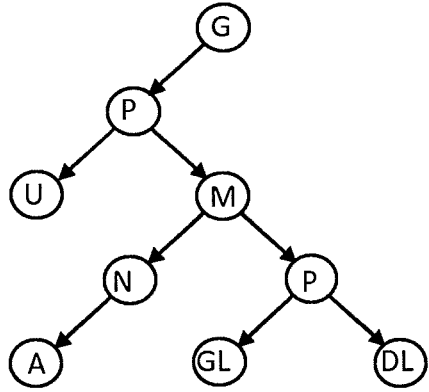
Figure 14B:
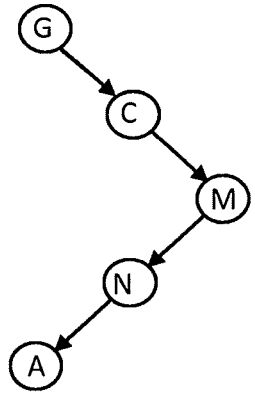

On both figures is shown the arborescence as known on the provider side, which is a provider P, typically a user device, and respectively, on FIG. 14A, the arborescence as known by a consumer C, which is here a policeman secure element, and on FIG. 14B, the arborescence as known by a consumer C which is here a nurse. The nurse will be able to check only if the user has allergies with the allergies attribute A while the policeman will be able to check the gun license attribute GL and the driver license attribute DL.

The arborescence comprises a common authority, which is for example a government G, having defined consumer group C and provider group P. The consumer C secure element of the user comprises a provider entity belonging to a plurality of groups enabling to discuss with a consumer corresponding group. In the example of FIGS. 14A and 14B, the provider entity belongs to the group of the university attribute U, the group of the minister attribute M, the group of the policeman attribute P, the group of the allergia attribute A, the group of the gun license GL and the group of the driver license DL.

As shown on FIG. 14A, the secure element of the policeman schematically represented on the right side, comprises a verification entity belonging only to a certain number of groups as listed above for the user's secure element. It thus belongs to the minister attribute M, the policeman attribute P, the gun license attribute GL and the driver license attribute DL.

On FIG. 14B, it can be seen that the nurse secure element has a verification entity belonging to the minister attribute M, the nurse attribute N and the allergia attribute A. With the invention, this secure element will be able to verify quickly the belonging of the provider entity of any other secure element to these attribute only. It is here noted that a same attribute for the user, for example the driving license attribute, can appear in the attributes that can be controlled by the nurse and in the attribute that can be controlled by the policeman. In this case distinct identifier will be advantageously used. However, as the attribute group is indeed under the nurse group or under the policeman group, the identification will anyhow be distinct.

The invention being based on the arborescence of groups enables to filter the role of the entities, in particular here of the verification entities.

Of course the provider can bring the exportable proof of the authentication via a RHA certificate which may seal some transaction parameters (date, amount, operations . . . ). The said exportable RHA certificate may be obtained without the authentication of the consumer and the checking can be delegated to a qualified server.

The solution is faster than the one using a PKI and there are no shared keys between the providers and the consumers of the attributes. Never large constants are exchanged between groups preventing the correlation of groups and disclosing of identities.

If needed the forward secrecy can be ensured with the invention by negotiating a session key for performing a tunnel (AES-CBC) between the attributes consumer and the attributes providers. The said session key may use a Diffie-Hellman Tunnel based on random seeds within an initial RHA tunnel. The combination of both ensures no man-in-the-middle attack and the forward secrecy due to the complexity to resolve large discrete logarithms.

Figure 15:
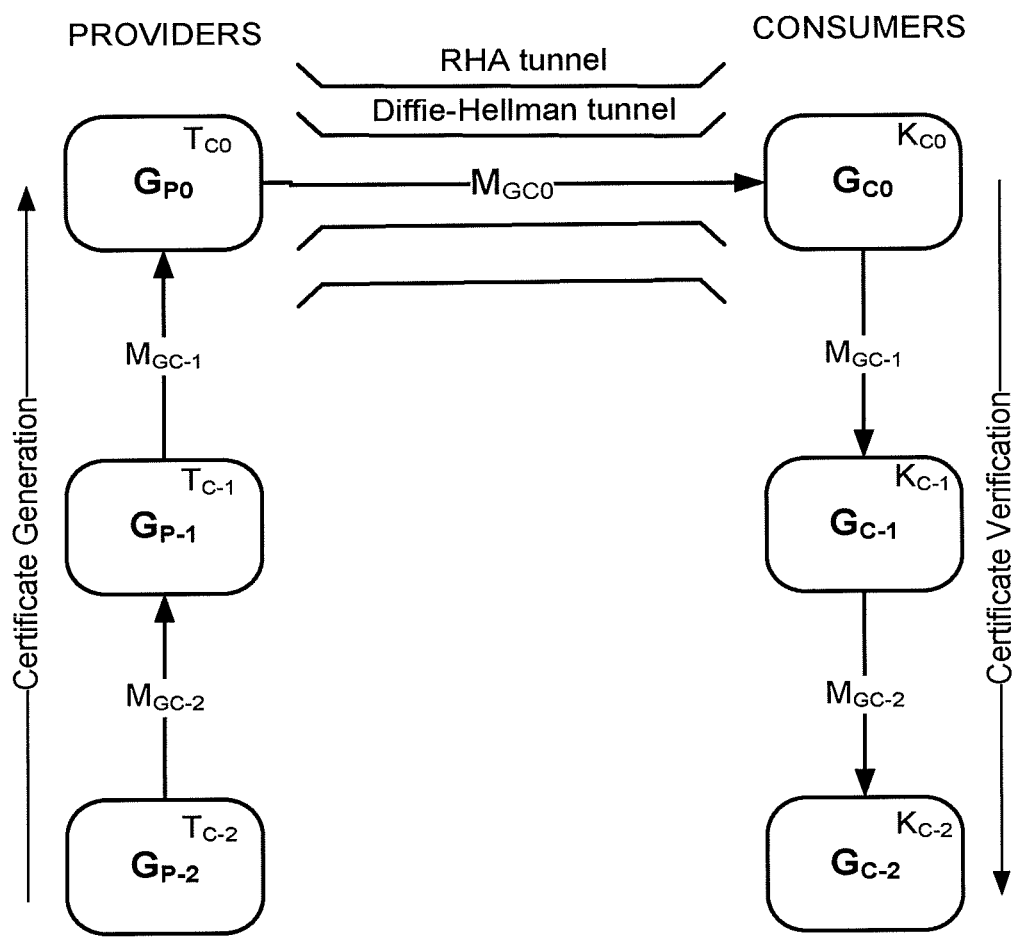
FIG. 15 shows an additional protection level used to transfer certificate.

This feature is illustrated on FIG. 15 where a Diffie-Hellman tunnel is built inside the RHA tunnel before communicating the certificate MC0. It is here noted that the certificate's circulation, typically an answer to a previously transferred certificate, is shown symmetric to the one shown on FIG. 8, illustrating the relativity of the denomination provider/consumer.

The invention necessitates however an enlarged management of secret group keys for the consumer group and for the provider group where, with a solution based on a PKI, only the provider group manages private keys.

This is advantageous when attributes authorities want to control who can consume the attributes.

The consumer can forge a valid consumer certificate but cannot transfer the said certificate to another consumer because the RHA tunnel for transferring a certificate is valid between the provider group and the consumer group. The certificates are only useable from consumers to providers or providers to consumers but not providers to providers or consumers to consumers.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method, for a provider entity belonging to a provider group, to authenticate its belonging to an attribute provider group to a verification entity belonging at least to a consumer group and to an attribute verification group, in a non-traceable manner without necessitating to share secret or large constants compromising privacy, both entities comprising at least one attribute group arborescence, this attribute group arborescence being shared by the provider entity and the verification entity when the provider entity has the attribute, each group being authenticated by an authority that stores a group secret key into the entities under its authority, comprising—the preliminary step of providing each entity from each group with a set of authentication tokens, one for each of the other groups with which the entity is intended to communicate, said authentication token comprising at least a random number and a cryptogram of at least this random number by the secret key of each of these other groups;

said method further comprising the steps of, when a verification is triggered, —for the verification entity, calculating a certificate from the attribute group arborescence, said certificate being calculated from the authentication tokens of the groups along the arborescence from the attribute verification group's token to the consumer group's token, establishing a secure channel based on the exchange of the cryptograms of the provider group and of the consumer group and sending the calculated certificate to the provider entity, for the provider entity, receiving and decrypting said certificate using the successive keys of the groups in the arborescence, using the decrypted random number of the authentication token of the attribute provider group to establish an attribute level's secure channel with the verification entity.

2. A method according to claim 1, wherein a challenge is further exchanged once the attribute level's secure channel is established.

3. A method according to claim 1, said method comprising a provision of a set of new authentication tokens for each level of the arborescence, this provision comprising the steps of calculating a token provisioner from the attribute group arborescence, said token provisioner being calculated, like the certificate, from the authentication tokens of the groups along the arborescence from the attribute provider group's token to the provider group's token, sending the token provisioner through the secure channel to the verification entity, —for the verification entity, receiving and decrypting said token provisioner using the successive keys of the groups in the arborescence, storing the extracted new authentication tokens at each levels after decryption.

4. A method according to claim 1, wherein said certificate is calculated for each group from lower group data in the arborescence, said data including at least an identifier of the lower group, the cryptogram of the lower group and, except for the attribute verification group, the previously calculated certificate for the lower group, said calculation including the encryption of at least the identifier of the lower group, the cryptogram of the authentication token for the lower group and the certificate of the lower group using the random number of the authentication token of the group.

5. A method according to claim 1, wherein additional parameters are introduced in the certificate.

6. A method according to claim 5, wherein said additional parameters are chosen among the group constituted by: new authentication token, specific operation code, revocation code, certificate checking code, addition of groups code, transaction parameters such as validity checking, payment amount, agency identifier, transaction role, timestamps limiting the validity, timestamps starting the validity at a given date, a duration, a count.

7. A method according to claim 1, the lower group being associated to an attribute identifier, the method comprises the step of, if the attribute identifier is unique or not ambiguous in the scope of an application, for the attribute provider group, accepting the request or denying it.

8. A method according to claim 7, wherein the acceptation or deny is decided in relation with a user's agreement or policy according to an application profile.

9. A device comprising a provider entity belonging to a provider group and able to authenticate its belonging to an attribute provider group to a verification entity belonging at least to a consumer group and to an attribute verification group, in a non-traceable manner without necessitating to share secret, said provider entity comprising at least one attribute group arborescence, this attribute group arborescence being shared by the provider entity and the verification entity when the provider entity has the attribute, each group being authenticated by an authority that stores a group secret key into the entities under its authority, said provider entity being provided with a set of authentication tokens, one for each of the other groups with which the device is intended to communicate, said authentication token comprising at least a random number and a cryptogram of at least this random number by the secret key of each of these other groups;

said provider entity being configured to establish secure channels with the verification entity;

said provider entity being further configured to, when a verification is triggered, receive, via a secure channel based on the exchange of the cryptograms of the provider group and of the consumer group, a certificate calculated from the attribute group arborescence by the verification entity, said certificate being calculated from the authentication tokens of the groups along the arborescence from the attribute verification group's token to the consumer group's token, said provider entity further comprising a decryption unit to decrypt said certificate using the successive keys of the groups in the arborescence, said provider entity being further able to establish an attribute level's secure channel with the verification entity using the decrypted random number of the authentication token of the attribute provider group.

10. A device comprising a verification entity belonging to a consumer group and to an attribute verification group, said verification entity being dedicated to verify the authentication of the belonging to an attribute provider group of a provider entity, said verification entity comprising at least one attribute group arborescence, this attribute group arborescence being shared by the provider entity and the verification entity when the provider entity has the attribute, each group being authenticated by an authority that stores a group secret key into the entities under its authority, said verification entity being provided with a set of authentication tokens, one for each of the other groups with which the device is intended to communicate, said authentication token comprising at least a random number and a cryptogram of at least this random number by the secret key of each of these other groups;

said verification entity comprising calculation means to calculate a certificate from the attribute group arborescence, said certificate being calculated from the authentication tokens of the groups along the arborescence from the attribute verification group's token to the consumer group's token, said verification entity being configured to establish secure channels with the provider entity;

said verification entity being further configured to, when a verification is triggered, send the calculated certificate via a secure channel based on the exchange of the cryptograms of the provider group and of the consumer group, said verification entity being further configured to establish an attribute level's secure channel with the verification entity using the decrypted random number of the authentication token of the attribute provider group.

* * * * *